Patented Sept. 22, 1936

2,054,903

UNITED STATES PATENT OFFICE 2,054,903

POLYMERIZATION PRODUCT

Max Hagedorn, Dessau in Anhalt, Germany, assignor to I. G. Farbenindustrie Aktiengesellschaft, Frankfort-on-the-Main, Germany, a corporation of Germany No Drawing. Application October 31, 1933, Serial No. 696,115. In Germany November 5, 1932

9 Claims. (Cl. 260—25)

My present invention relates to the manufacture of polymerization products.

One of its objects is the process of producing salts or peptonization products from polymerization products of unsaturated acids with organic bases. Other objects are the new polymerization products. Further objects will be seen from the detailed specification following hereafter.

In my co-pending U. S. application Ser. No. 673,927 I have described a process of preparing a solution of inorganic salts of the polymeric carboxylic acids and the use of these solutions for the manufacture of shaped articles.

According to the present invention I have succeeded in applying the above process to the formation of compounds from the polymerization products of unsaturated acids with organic bases of all kinds, suitable for the preparation of novel and technically valuable colloidal solutions which can be molded into articles of various kinds.

These compounds are obtainable either by reacting on the free polymeric carboxylic acids or their salts with free organic bases or their salts. It depends upon the particular case which of these ways must be adopted. When using bases of little basicity or using bases having such a high molecular weight that the molecules already approach the dimensions of the molecules of the colloidal bodies, part of these bases may be combined with the polymeric-carboxylic acids by peptization instead of by formation of salts. The reaction is carried out in the presence of a suitable solvent, for instance, the polymeric-carboxylic acid is dissolved in water and the base is then added. Suitable polymeric carboxylic acids are, for instance, polyacrylic acid, or the acids derived from the polymerization product from a mixture of styrol and maleic acid or its anhydride, the polymerization product from a mixture of vinyl butylether and maleic acid or its anhydride, the polymerization product from a mixture of styrol and fumaric acid and the polymerization product from a mixture of methylenemaleic acid and styrol. For the polymerization there may also be used acid anhydrides or esters which after the condensation are transformed into the polymeric acids or their sodium salts.

If the reaction product is insoluble in the reaction medium it may be freed from the surplus of solvent by filtering and washing. If it is soluble in the reaction medium, it may be precipitated on addition of a precipitant and purified by extraction. The pure compounds are dissolved in water, if required with the addition of a weak alkali (a dilute caustic potash solution, alkali carbonates, ammonia, organic bases, such as oxyethylamine) or with the addition of an organic solvent. If the molecular weight of the base employed is very high and the character of the salt is essentially determined by the properties of the basic reagent there may be used organic solvents alone.

For making the solutions into films, sheets, plates, layers and similar articles, they may be cast on a support, or spun, or sprayed and so on. Instead of being molded from solutions, the undissolved or insoluble compounds may be molded by directly pressing, melting or shaping them by the methods known in the celluloid art. Another important mode of separating the dissolved products from their solutions consists in precipitating them on a substratum. All of these processes allow the addition of softening or filling agents of all kinds, as well as of other colloids.

In consequence the novel colloids obtainable according to this invention are useful for a great variety of applications. Thus they may be used medicinally for inward or outward application in form of colloidal solutions, or as films, for the extermination of plant pests, as anti-parasitic adhesive layers, quite generally in the dyeing industry, for instance, by applying the compounds formed from the polymeric carboxylic acids and basic dyestuffs or intermediate products therefor to the dyeing of fibres of all kinds, as lake-formers, for instance, with silver halides, if required in the presence of a binding agent, a diluent and the like in any of these with applications the known auxiliary processes may be used. They may be applied as lacquer layers, light filter layers, protective coatings, intermediate layers, as employed, for instance, for photographic purposes or in the industry of plastic masses.

The following examples illustrate the invention:

*Example 1.*—10 grams of quinine sulfate are converted into the free base by heating them with 70 cc. of $n/2$ NaOH. The base is suspended in an aqueous solution of methyl alcohol mixed with an aqueous solution containing an excess of polyacrylic acid and the mixture is stirred for about ½ hour. The precipitate, which is of a silghtly pasty consistency, is filtered off and dissolved in methanol while adding a small amount of aqueous ammonia and glycolmonomethylether. By casting this solution on to a glass plate and evaporating the solvent a clear and transparent film is obtained capable of absorbing the ultraviolet light, as it is known of quinine salt solutions. Furthermore it may be used for medical purposes as a quinine preparation of which a required dose can be measured conveniently and with certainty.

Instead of the polyacrylic acid there may be used the mixed polymerization product from styrol and maleic acid anhydride (mixed in the proportion of 1:1) which is converted into the polymeric carboxylic acid by the addition of water.

Example 2.—Crude nicotine is dissolved in an aqueous solution containing an excess of polyacrylic acid to form a clear brown solution which, when applied to plants or the like by spraying, yields protective layers having a good adhesive power. All assistants known in the extermination of plant pests may be added to the solution.

Example 3.—An aqueous solution of methylene blue is mixed with an aqueous solution of polyacrylic acid. The precipitate obtained has a deep-blue color and may be freed, if required, from an excess of dystuff, for instance, by kneading it with water. The product is soluble in a solution containing an excess of polyacrylic acid preferably with the assistance of gentle heating. This dark blue solution may be employed for the preparation of sheets of any kind, either as such or in connection with a support or it may be employed for directly dyeing cotton.

What I claim is:

1. A process of producing plastic masses which comprises reacting on the polymerization product of an unsaturated carboxylic acid with a heterocyclic tertiary base in the presence of a solvent.

2. A process of producing plastic masses which comprises dissolving polyacrylic acid in water, suspending quinine in aqueous methanol, mixing the solution and the suspension while stirring and filtering the reaction product.

3. A process of producing plastic masses which comprises dissolving polyacrylic acid in water and dissolving in this solution less than the equivalent amount of nicotine.

4. A process of producing plastic masses which comprises dissolving methylene blue in water, dissolving polyacrylic acid in water, mixing the two solutions in water, and freeing the precipitate from an excess of dyestuff by kneading the precipitate with water.

5. The salt of a heterocyclic tertiary base and a polymeric carboxylic acid.

6. The peptization product of a heterocyclic tetiary base and a polymeric carboxylic acid.

7. The salt of quinine and polyacrylic acid.

8. The salt of nicotine and polyacrylic acid.

9. The salt of methylene blue and polyacrylic acid.

MAX HAGEDORN.